3,129,210
PROCESS FOR POLYMERIZING N-VINYL
LACTAMS
Frederick Grosser, Midland Park, and Marvin R. Leibowitz, Edison, N.J., assignors to General Aniline & Film Corporation, New York, N.Y., a corporation of Delaware
No Drawing. Filed Dec. 9, 1960, Ser. No. 74,762
7 Claims. (Cl. 260—88.3)

This invention relates to an improved process for the preparation of polymeric N-vinyl lactams.

N-vinyl-2-pyrrolidone has been polymerized heretofore in aqueous solution, using a peroxide catalyst, such as $H_2O_2$, and an amine or ammonia as a catalyst activator, to form polymers having an average molecular weight ranging from 10,000 to 400,000. Such polymers darken quite rapidly, however, and are subject to cross-linking and consequently gelling, when subjected to prolonged heating. The peroxide catalyst causes decomposition of a portion of the monomer and lowers the polymer yield, with formation of undesirable and odoriferous by-products.

Azo polymerization catalysts have also been used for polymerization of N-vinyl-2-pyrrolidone, but heretofore such catalysts yielded only very high molecular weight polymers e.g. products having a molecular weight above 250,000. In various industrial applications—especially as additives in synthetic fibres—N-vinyl-2-pyrrolidone polymers having a medium average molecular weight (from about 40,000 to 160,000) are required. Polymers of higher molecular weight yield solutions of excessive viscosity, resulting in gelling and consequent difficulties in handling, while lower molecular weight polymers fail to produce the desired improvement in dyeing properties which can be obtained with polymers of the aforesaid medium molecular weight range.

Azo polymerization catalysts, employed heretofore, could only be used to polymerize N-vinyl-2-pyrrolidone in relatively dilute solution—particularly solutions having a maximum monomer concentration of about 30%, since at higher concentrations, the solutions became too viscous to handle. Moreover, because of the highly exothermic nature of the reaction, temperature control became exceedingly difficult at monomer concentrations above 20%, and over-heating tended to cause cross-linking of the polymer. Thus, satisfactory control of the polymerization to produce uniform results was difficult to attain unless the monomer concentration was reduced below 20%, and the azo catalyst concentration to 0.1 to 0.2%.

Polymers of N-vinyl lactams, e.g. polymeric N-vinyl-2-pyrrolidone, are often subjected to relatively high temperatures in commercial applications. For example, synthetic fibres in which the polymeric N-vinyl lactams are incorporated by blending or "grafting" (e.g. to impart increased dye substantivity) are subjected to high temperatures during processing and spinning. It is therefore desirable that N-vinyl lactam polymers should withstand the elevated temperatures employed without darkening, gelling, or other modifications which cause changes in shade or dullness in the colorations produced on the fibre in subsequent dyeing. Similarly, stability against darkening and gelling in N-vinyl lactam polymers for use in the preparation of coatings, adhesives and paints is also desired.

It is an object of this invention to provide an improved method for preparing polymers of N-vinyl lactams characterized by high stability in color and viscosity, especially when subjected to prolonged heating, without the inclusion of stabilizing additives in the polymer soluton. Another object is to provide a reliable method for preparing said polymers in a range of molecular weights including the medium range which is especially useful in commercial applications. Another object is to provide a method of producing said polymers in solutions of relatively high concentration at a fast polymerization rate, yielding reliably reproducible results, using starting materials of normal industrial purity.

We have discovered that these objects can be attained by progressively adding a quantity of monomeric N-vinyl lactam at a substantially uniform rate over a period of at least ½ hour, to a neutral to alkaline aqueous solution serving as the polymerization medium which is maintained at boiling temperature, preferably while maintaining the pH within the range from 8 to 12, concurrently and progressively adding a corresponding quantity of an azo polymerization catalyst to said medium, and continuing to heat the mixture at boiling temperatures after completing the addition of monomer and catalyst until the polymerizaion is substantially complete.

Water alone can be used as the polymerization medium in carrying out the polymerization according to this invention. However, the polymerization medium preferably employed is an aqueous solution of a salt of a weak acid with a strong base in a concentration of 0.05 to 1%, adapted to maintain the solution at a pH of 8 to 12 throughout the polymerization. Suitable salts are, for example, carbonates, borates, dibasic phosphates and acetates of alkali metals—particularly of sodium and potassium—e.g. $Na_2CO_3$, $NaHCO_3$, $K_2HPO_4$, $Na_2B_4O_7$, $NaOCOCH_3$, $Na_2HPO_4$, etc. If desired, up to 10% of the water can be replaced by organic solvents which are unreactive toward the other components of the mixture and soluble therein in the proportions employed. A number of these additives are effective as chain transfer solvents which tend to reduce the molecular weight of the polymer produced. Such solevnts are, for example, methanol, ethanol, isopropanol, methyl ethyl ketone, cumene and chlorinated hydrocarbons such as $CCl_4$.

The amount of aqueous solution serving as the polymerization medium relative to the quantity of monomeric N-vinyl lactam to be polymerized should be such as to yield a polymer concentration which will not be so viscous as to cause difficulty in handling. Preferably, the quantities of monomeric N-vinyl lactam and aqueous solution are chosen to provide a monomer concentration in the aqueous mixture of 30 to 60% by weight. Within this range, the proportion of monomer ultimately added to the mixture can be varied to control the molecular weight of the polymer produced. The molecular weight of the polymer increases as the proportion of monomer in the mixture is increased.

Monomeric N-vinyl lactams which can be polymerized advantageously according to this invention are compounds having 5- to 7-member saturated lactam rings containing in addition to the nitrogen of the amido linkage, not more than one additional hetero atom—such atom, if present, being oxygen or nitrogen, in a position non-adjacent to the amido nitrogen. The lactam ring can be unsubstituted, or may contain as substituents, hydrocarbon groups of up to 6 carbon atoms which can themselves be unsubstituted or contain substituents such as hydroxyl, amino or alkylamino groups. Thus monomeric lactams suitable for use in the present invention include:

N-vinyl-2-pyrrolidone
5-methyl- and 5-ethyl-N-vinyl-2-pyrrolidone
3-methyl- and 3-ethyl-N-vinyl-2-pyrrolidone
4-methyl- and 4-ethyl-N-vinyl-2-pyrrolidone
3,3-dimethyl-N-vinyl-2-pyrrolidone
5-hydroxymethyl-N-vinyl-2-pyrrolidone
3-phenyl-3β-diethylaminoethyl-N-vinyl-2-pyrrolidone
N-vinyl-2-oxazolidone
5-methyl-N-vinyl-2-oxazolidone
N-vinyl-3-morpholinone
2,6-dimethyl-N-vinyl-2-morpholinone
5-methyl-N-vinyl-3-morpholinone
N-vinyl-2-piperidone
N-vinyl-ε-aminocaproic acid lactam The catalysts employed in accordance with this invention which are referred to herein as "azo polymerization catalysts" are organic azo compounds containing an acyclic azo group having bonded to each nitrogen a discrete aliphatic or alicyclic tertiary carbon atom, of which at least one valence is satisfied by a nitrile, carbonamide or carbalkoxy group, as described in U.S. Patent 2,471,959 of May 31, 1949 to Hunt. They are preferably nitrile of the formula:

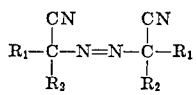

wherein $R_1$ and $R_2$ are saturated hydrocarbon radicals, or represent jointly a polymethylene chain containing 2 to 5 carbon atoms. Such compounds are, for example,

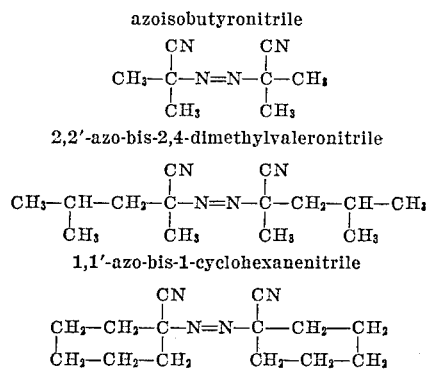

The azo catalyst can be employed in concentrations of 0.1 to 3.0% by weight of the monomer. Lower proportions of catalyst within the range favor production of higher molecular weight polymers and vice-versa. The catalyst is advantageously added to the polymerization mixture in the form of an aqueous slurry. A portion of the polymer to be formed may serve appropriately as a dispersing agent in such a slurry. Thus, a suitable slurry can be prepared by agitating the powdered azo catalyst with 3 to 4 times its weight of a mixture of approximately equal parts of water and polymeric N-vinyl lactam. Alternatively, the catalyst can be added progressively in powdered form to the polymerization mixture, concurrently with addition of the monomer; or the catalyst can be dissolved in the monomer at sufficiently low temperature to avoid polymerization, directly before adding the monomer to the heated polymerization reaction mixture. However, separate addition of catalyst and monomer to the polymerization mixture is preferred to avoid possible premature polymerization.

In carrying out the process of the invention, the aqueous neutral to alkaline solution preferably containing 0.05–1.0% alkaline reacting salt to maintain the pH at 8–12, is agitated and heated to boiling under reflux. Preferably air is removed from the apparatus by displacement with an inert gas such as nitrogen. The monomer and azo catalyst are then each progressively and concurrently added at a substantially uniform rate (either by frequent increments or continuous addition) to the boiling agitated solution, such that the addition of both monomer and catalyst is complete at the end of at least ½ hour and preferably about 1 hour. The addition can be extended over a longer period e.g. 2 hours, but since this is unnecessary, it is preferred in the interest of economy to adjust the duration of the addition to about 1 hour.

When addition of the monomer and catalyst is complete, the mixture is boiled for a sufficient additional time to complete the polymerization. In general about ½ hour is required. Completion of the reaction can be conveniently determined by analysis of the mixture for unreacted monomer. When the concentration of the monomer decreases below 0.5%, polymerization may be regarded as complete.

Our invention will be more fully understood by the following examples wherein parts and percentages are by weight, unless otherwise indicated.

*Example 1*

A solution of 0.9 grams of sodium bicarbonate in 275 grams of distilled water was agitated in a flask and heated to boiling under reflux, while air in the apparatus was displaced by nitrogen. A freshly prepared solution of 0.88 grams of azoisobutyronitrile in 225 grams of N-vinyl-2-pyrrolidone was added at a substantially uniform rate over a period of 1 hour to the boiling aqueous solution. After addition of the monomer-catalyst solution was complete, boiling was continued for an additional ½ hour. Analysis of a sample of the resulting mixture indicated the concentration of monomeric N-vinyl-2-pyrrolidone therein to be 0.27%. The analysis was based upon absorption of iodine by the vinyl group of the unreacted monomer in the reaction mixture. The polymer solution containing 45% solids was then cooled and discharged. The K value of the resulting polymer was found to be 59.2, corresponding to a molecular weight of 160,000. (K value of the polymer is determined from relative viscosity in aqueous solution, and the molecular weight is calculated therefrom, as explained in U.S. Patent 2,811,449 of October 29, 1957 to Witwer et al.)

For purposes of comparison, N-vinyl-2-pyrrolidone was polymerized according to the known procedure using hydrogen peroxide and aqueous ammonia as the catalyst. A solution of 270 grams of N-vinyl-2-pyrrolidone in 330 grams of distilled water containing 0.8 ml. of 28% aqueous ammonia was agitated in a flask equipped with a reflux condenser, and the air displaced by nitrogen. The mixture was heated to 50° C. and 0.8 ml. of 35% aqueous hydrogen peroxide was added. The temperature rose rapidly to boiling during the first 10 minutes and external cooling was applied. After about 30 minutes the temperature decreased below the boiling point, and at the end of 2 hours had reached 55° C. Analysis indicated that the residual monomer concentration was 2.69%. Further polymerization was promoted by adding 0.8 ml. each of 35% hydrogen peroxide and 28% aqueous ammonia on three occasions at intervals of 2 hours, while maintaining the temperature at 57° C. After 8 hours, the residual monomer concentration was found to amount to 0.18%. 2.1 ml. of glacial acetic acid were added to inhibit gelling and cross-linking. The polymerization mixture contained 45.9% solids, and the polymer was found to have a K value of 59.5 and a molecular weight of 160,000.

Samples of the polymer solutions prepared respectively according to the example and by use of a hydrogen peroxide catalyst as described above were compared for color stability and stability to gelling. For this purpose the samples were maintained at a temperature of 90° C. and the color was tested at intervals by diluting a portion of the sample to 5% solid content, and rating the color of the diluted solution in terms of the color scale of the American Public Health Association (APHA). The degree of gelling was measured by determining the relative viscosity and calculating the K value at the beginning and end of the heating period. The results were as follows:

| Time | Sample of Example 1 | Peroxide Polymerized Sample |
|---|---|---|
| | Color (APHA standard) | |
| 0 | 10 | 10 |
| 3 days | 25 | 100 |
| 6 days | 35 | 200 |
| 21 days | 55 | >200 |
| | K Value | |
| 0 | 59.2 | 59.5 |
| 21 days | 59.1 | 75.9 |

The results indicate that polymers produced according to the process of the invention are distinguished from similar polymers prepared according to the known method employing a peroxide catalyst by stability to gelling and greatly improved stability to discoloration. Furthermore, it was observed that the 5% solutions prepared in the color stability test from the peroxide-catalyzed polymer developed mold rapidly, while corresponding solutions of the polymer produced according to the example with an azo catalyst remained mold-free.

For purposes of further comparison, an attempt was made to substitute azoisobutyronitrile as the catalyst for hydrogen peroxide and ammonia in the last described procedure, in which, however, the monomer concentration in the polymerization mixture was reduced to 30%. Polymerization occurred so violently that the top of the kettle was torn off, despite the relatively low concentration of monomer in the aqueous solution and the fact that the kettle was only 1/6 full. Previously known polymerizations of N-vinyl-2-pyrrolidone with azoisobutyronitrile involved operation at a monomer concentration below 20%, and yielded a polymer having a molecular weight exceeding 250,000.

*Example 2*

The process of Example 1 was repeated at increased dilution, employing 525 grams, rather than 275 grams, of water and increasing the catalyst from 0.88 to 4.5 grams of azoisobutyronitrile. The monomer concentration thus amounted to 30% of the mixture and the catalyst to 2% of the monomer. Polymerization was effected otherwise in the same manner as described in Example 1. The K value of the product obtained was found to be approximately 30, corresponding to a molecular weight of 40,000.

*Example 3*

Example 2 was repeated except that the quantity of azoisobutyronitrile catalyst was reduced to 0.23 gram, or 0.1% of the weight of the monomer. The K value of the resulting polymer was found to be approximately 90 corresponding to a molecular weight of 400,000.

*Example 4*

1,350 lbs. of distilled water were charged to a stainless steel kettle equipped with an agitator, a reflux condenser and a heating and cooling jacket, and heated therein to boiling under reflux. 1,200 lbs. of N-vinyl-2-pyrrolidone were added at a rate of 20 lbs. per minute, concurrently with a uniform suspension of 6 lbs. of powdered azoisobutyronitrile dispersed in a solution of 12 lbs. of poly-N-vinyl-2-pyrrolidone having a K value of 55 in 10 lbs. of water. The catalyst suspension was added at the rate of 0.45 lb. per minute. The heat liberated by the reaction was dissipated by reflux of the aqueous medium permitting convenient maintenance of the desired temperature at the desired value. At the end of 1 hour, addition of the N-vinyl-2-pyrrolidone and azo catalyst was complete. The temperature was maintained at the same level for an additional 1/2 hour to complete the polymerization, and it was found that the residual monomer concentration at the end of this period was below 0.5%. The resulting solution contained 45 to 50% of solids, and the polymer had a K value of 55 to 60. Numerous repetitions of the procedure of this example yielded polymers of which the K value varied by less than 2%. The stability to discoloration and gelling of the product is surprisingly superior as compared with a polymer prepared under similar conditions but in the presence of hydrogen peroxide and ammonia rather than azoisobutyronitrile. However, repetition of the example with inclusion of 5 lbs. of sodium bicarbonate in the aqueous reaction medium initially charged to the reaction kettle causes a substantial improvement in the stability of the product to discoloration and gelling.

All or part of the N-vinyl-2-pyrrolidone can be replaced in the foregoing examples by one or more of the N-vinyl lactams listed above in the discussion preceding the examples, to produce polymers having similarly improved properties. Other azo catalysts of the type described and illustrated above can be substituted for azoisobutyronitrile in the examples.

Other variations and modifications which will be obvious to those skilled in the art can be made in the process of this invention without departing from the scope or spirit thereof.

We claim:

1. In a process for the preparation of polymeric N-vinyl lactams, the improvement which comprises progressively adding a quantity of an N-vinyl lactam monomer at a substantially uniform rate over a period of at least 1/2 hour to an aqueous neutral to alkaline polymerizing medium maintained at boiling temperature, concurrently and progressively adding to said medium a quantity of azo polymerization catalyst amounting to 0.1 to 3% by weight of said monomer, and heating said mixture at polymerization temperature after said additions are complete until polymerization is substantially complete, the quantity of said aqueous polymerization medium being such as to yield a 30 to 60% solution of the resulting polymer in the final solution.

2. A process as defined in claim 1 wherein the pH of said aqueous medium is maintained within the range of 8 to 12.

3. A process as defined in claim 2 wherein said aqueous polymerizing medium is a solution in water of an alkali metal salt of a weak acid at a concentration of 0.5 to 1% by weight.

4. A process as defined in claim 1 wherein the N-vinyl lactam subjected to polymerization consists of N-vinyl-2-pyrrolidone.

5. A process as defined in claim 4 wherein the addition of said monomer and of said azo catalyst is effected over a period of about 1 hour and wherein said aqueous medium is maintained at a range of 8 to 12.

6. In the polymerization of N-vinyl-2-pyrrolidone the improvement which comprises progressively adding a quantity of monomeric N-vinyl-2-pyrrolidone at a substantially uniform rate over a period of about 1 hour to a solution in water of an alkali metal salt of a weak acid having a concentration of 0.05 to 1% by weight, yielding a pH of 8 to 12 while maintaining said solution at boiling temperature under reflux, concurrently and progressively adding to said solution a quantity of an azo polymerization catalyst corresponding to 0.1 to 3% by weight of said monomer, and heating the reaction mixture to boiling under reflux for ½ hour after the addition of said monomer and said catalyst is complete.

7. A process as defined in claim 6 wherein said catalyst is added in the form of an aqueous slurry in an aqueous solution of the polymer to be prepared in the reaction mixture.

References Cited in the file of this patent

UNITED STATES PATENTS

| | | |
|---|---|---|
| 2,471,959 | Hunt | May 31, 1946 |
| 2,667,473 | Morner | Jan. 26, 1954 |
| 2,676,949 | Morner | Apr. 27, 1954 |
| 2,831,836 | Forchielli | Apr. 22, 1958 |